United States Patent
Fortin

(10) Patent No.: US 9,384,065 B2
(45) Date of Patent: Jul. 5, 2016

(54) MEMORY ARRAY WITH ATOMIC TEST AND SET

(71) Applicant: VIOLIN MEMORY INC, Santa Clara, CA (US)

(72) Inventor: Kyle Fortin, San Jose, CA (US)

(73) Assignee: VIOLIN MEMORY, Santa Clara, CA (US)

( * ) Notice: Subject to any disclaimer, the term of this patent is extended or adjusted under 35 U.S.C. 154(b) by 425 days.

(21) Appl. No.: 14/080,004

(22) Filed: Nov. 14, 2013

(65) Prior Publication Data

US 2014/0136799 A1   May 15, 2014

Related U.S. Application Data

(60) Provisional application No. 61/726,764, filed on Nov. 15, 2012.

(51) Int. Cl.
| | |
|---|---|
| *G06F 12/00* | (2006.01) |
| *G06F 9/52* | (2006.01) |
| *G06F 12/08* | (2016.01) |
| *G06F 13/00* | (2006.01) |

(52) U.S. Cl.
CPC ............ *G06F 9/526* (2013.01); *G06F 12/0837* (2013.01); *G06F 2209/523* (2013.01)

(58) Field of Classification Search
CPC ................................. G06F 12/00; G06F 13/00
USPC ...................... 710/100, 36; 711/152; 370/401
See application file for complete search history.

(56) References Cited

U.S. PATENT DOCUMENTS

| | | | | |
|---|---|---|---|---|
| 5,191,652 A | * | 3/1993 | Dias | H04L 12/43 370/458 |
| 5,535,365 A | * | 7/1996 | Barriuso | G06F 9/526 710/200 |
| 5,983,329 A | * | 11/1999 | Thaler | G06F 12/126 711/145 |
| 6,578,131 B1 | * | 6/2003 | Larson | G06F 17/30949 707/E17.036 |
| 2002/0138544 A1 | * | 9/2002 | Long | G06F 9/52 718/107 |
| 2003/0037223 A1 | | 2/2003 | Steely, Jr. et al. | |
| 2003/0172238 A1 | | 9/2003 | Tessarolo et al. | |
| 2004/0059734 A1 | | 3/2004 | Smith et al. | |
| 2007/0186056 A1 | * | 8/2007 | Saha | G06F 9/466 711/144 |
| 2008/0256288 A1 | | 10/2008 | Matsuoka et al. | |
| 2009/0172335 A1 | * | 7/2009 | Kulkarni | G06F 3/061 711/170 |

(Continued)

FOREIGN PATENT DOCUMENTS

WO    2008-008245 A2   1/2008

OTHER PUBLICATIONS

International Search Report for Related PCT Application No. PCT/US2013/070003, Mailing Date Dec. 3, 2013.

*Primary Examiner* — Christopher Shin
(74) *Attorney, Agent, or Firm* — Brinks Gilson & Lione

(57) ABSTRACT

A system and method of managing the storage of data is described where a plurality of requesting entities can be permitted access to a shared data resource. When a modification to the data is needed, the request may be executed as an atomic operation. To do this the memory region is temporarily locked until the atomic operation is completed so that other operations related to the data are deferred until the atomic operation has completed. The lock is secured by reference to a data array or register of fixed length where the address of the locked data region is represented by a bit, the position of which is determined by computing a hash value of the address modulo the length of the lock register.

25 Claims, 5 Drawing Sheets

(56) References Cited

U.S. PATENT DOCUMENTS

| | | | | |
|---|---|---|---|---|
| 2011/0138135 A1* | 6/2011 | Dice | ............... | G06F 12/00 711/152 |
| 2012/0020371 A1* | 1/2012 | Nemawarkar | ........ | G06F 15/167 370/412 |
| 2013/0166879 A1* | 6/2013 | Sun | ............... | G06F 9/52 712/30 |
| 2013/0182713 A1* | 7/2013 | Giacomoni | ........... | H04L 69/321 370/400 |
| 2014/0189260 A1* | 7/2014 | Wang | ............... | G06F 12/1416 711/152 |

* cited by examiner

MEMORY ARRAY WITH ATOMIC TEST AND SET

This application claims the benefit of U.S. provisional application No. 61/726,764 filed on Nov. 15, 2012, which is incorporated herein by reference.

BACKGROUND

The terms "memory system" and "storage system" are generally used interchangeably herein. Existing terminology is changing as more of the on-line data and near-line data of large systems is being stored in solid state devices such as FLASH memory arrays rather than rotating disk drives. A storage system was previously considered to be primarily disk based and having data retrieval and writing latencies dominated by the mechanical performance of the disk drive. Often the disks were connected to the processor through a network connection. Memory systems were considered to be either directly attached to the processor requiring the data, or having sufficiently low latency as to cause little bottleneck in the processing speed.

As the latency of large FLASH memory arrays is considerably less than that of disks, yet the storage capacity and economics of such FLASH memory arrays is beginning to compete directly with disk-based systems, the distinction between a "memory system" and a "storage system" is somewhat blurred. Here we use the terms to describe a solid-state memory system, whether connected to the using server directly or through some network connection. The term network connection is intended to encompass all forms of data communications.

SUMMARY

A memory system having an address extent is described where the memory system includes a plurality of memory modules and a plurality of memory gateways, each memory gateway having a communications interface configured to interface with a network, The memory gateways of the plurality of gateways are configured to receive a request for exclusive access (lock) to an address within the address extent of the memory system and to manage requests so as to provide such exclusive access unless such exclusive access to the logical block address has been previously requested and such exclusive access has not been relinquished. The management of the exclusive access requests uses a hash computed on the requested address.

These functions may be provided by separate components or by an integrated device. The address extent may be expressed as physical memory addresses or as logical block addresses (LBA), logical unit numbers (LUN) or other abstraction.

In an aspect, the purpose of requesting exclusive access to an address, which may be an address range, is perform an atomic test and set function. When function has been performed (including failed to be performed in accordance with a protocol), the lock may be released.

In another aspect, the exclusive aspect may be managed by maintaining an array location or register having a fixed length and the hash value may be mapped to a bit in the fixed length array or register. For, example, the bit corresponding to the hashed value may be set when exclusive access has been granted. The bit may be reset when a request for exclusive access is grantable.

In still a further aspect, the memory system may include a plurality of memory controllers, where a group of the plurality of memory modules is controlled by a memory controller of a plurality of memory controllers. The group may be managed a RAID group. Where the RAID group is FLASH memory, the read or write operations of the RAID group may be managed so as to reduce the effects of write or erase operations on the latency of responding to the user requests for reading or writing of data.

Memory gateways may be configured recognize a failed memory controller of the group of memory controllers and to access memory modules associated with the failed memory controller through another memory controller of the plurality of memory controllers.

A method of managing a memory system is described including the steps of receiving a request for exclusive access (lock) to an address of the memory system; computing a bit position in a fixed length register or array based on a hash value of the address, modulo a length of the fixed length register or array; determining whether a lock has been previously granted and: if the lock has not been previously granted, grant the lock request and set the corresponding bit in the fixed length register; or, if the lock has been previously granted and not released, refuse the lock.

A person of skill in the art will understand that the terms register and array are analogous for the purposes described and the usage commonly depends on whether a specific hardware location is used rather than a memory location in a computer. Similarly, whether the physical memory address or a logical memory address is used, through abstractions, depends on the specific application.

In an aspect, the lock is requested for the purpose of performing an atomic test and set operation on the address, and the lock is released after performing the operation. The atomic test and set operation may have the format of a SCSI SBC-3 Compare and Write command to an LBA of a provisioned logical unit number (LUN). Other commands and formats may be used for operations where a lock is desired.

In an aspect, the bit in the bit register is reset when the lock is released. A request for lock may be queued for a retry if the lock was refused. A retry may be performed, for example, whenever the status of the fixed-length register changes to indicate that a lock has been released. To avoid a blockage due to an error, the bits of the register are reset if the register status has not been updated within a predetermine time period.

A computer program product, stored on a non-volatile computer readable medium is described, having instructions executable by a computer to:

receive a request for exclusive access (lock) to an address of a memory system;

compute a bit position in a fixed length array based on a hash value of the address, modulo a length of the fixed length array;

determine whether a lock has been previously granted and,
    if the lock has not been previously granted, grant the lock request and set the bit in the array; or,
    if the lock has been previously granted and not released, refuse the lock.

In an aspect, the hash may be computed using a crc32( ) function of an Intel processor and represented as a bit position modulo the length of a hardware register.

DESCRIPTION

Figure 1:
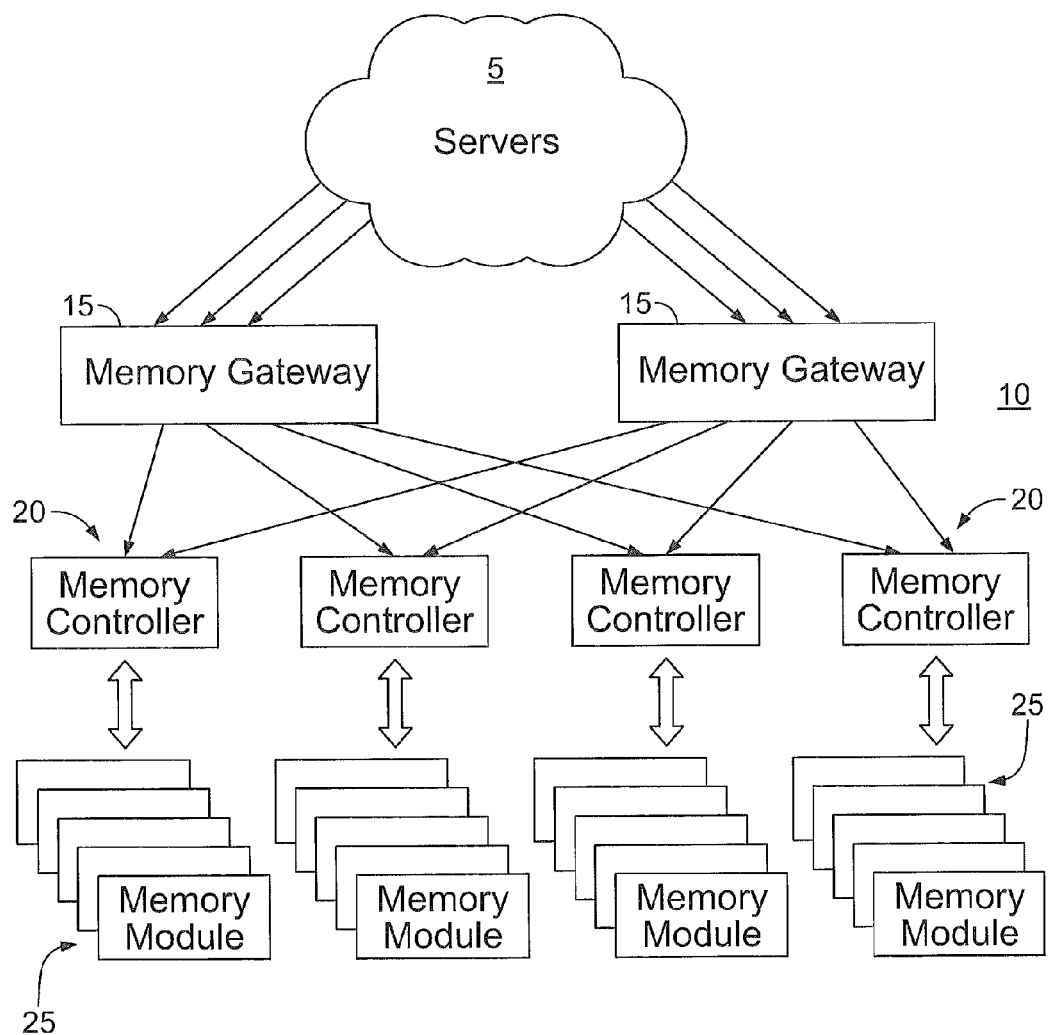
FIG. 1 illustrates an example data storage system where a plurality of requesting entities are afforded access to the memory space through a plurality of data interfaces.

Exemplary embodiments may be better understood with reference to the drawings, but these embodiments are not intended to be of a limiting nature. Like numbered elements in the same or different drawings perform equivalent functions. Elements may be either numbered or designated by acronyms, or both, and the choice between the representation is made merely for clarity, so that an element designated by a numeral, and the same element designated by an acronym or alphanumeric indicator should not be distinguished on that basis.

It will be appreciated that the methods described and the apparatus shown in the figures may be configured or embodied in machine-executable instructions, e.g. software, or in hardware, or in a combination of both. The machine-executable instructions can be used to cause a general-purpose computer, a special-purpose processor, such as a DSP or array processor, or the like, that acts on the instructions to perform functions described herein. Alternatively, the operations might be performed by hardware components that may have hardwired logic or firmware instructions for performing the operations described, such as field programmable gate arrays (FPGA), application specific integrated circuits (ASIC), or by any combination of programmed computer components and custom hardware components, which may include analog circuits.

The methods may be provided, at least in part, as a computer program product that may include a non-volatile machine-readable medium having stored thereon instructions which may be used to program a computer (or other electronic devices) to perform the methods. For the purposes of this specification, the terms "machine-readable medium" shall be taken to include any medium that is capable of storing or encoding a sequence of instructions or data for execution by a computing machine or special-purpose hardware and that may cause the machine or special purpose hardware to perform any one of the methodologies or functions of the present invention. The term "machine-readable medium" shall accordingly be taken include, but not be limited to, solid-state memories, optical and magnetic disks, magnetic memories, and optical memories, as well as any equivalent device that may be developed for such purpose.

For example, but not by way of limitation, a machine readable medium may include read-only memory (ROM); random access memory (RAM) of all types (e.g., SRAM, DRAM, PRAM); programmable read only memory (PROM); electronically alterable read only memory (EPROM); magnetic random access memory; magnetic disk storage media; flash memory, which may be NAND or NOR configured; memory resistors; or electrical, optical, acoustical data storage medium, or the like. A volatile memory device such as DRAM may be used to store the computer program product provided that the volatile memory device is part of a system having a power supply, and the power supply or a battery provides power to the circuit for the time period during which the computer program product is stored on the volatile memory device. This property is known as being non-transient.

Furthermore, it is common in the art to speak of software, in one form or another (e.g., program, procedure, process, application, module, algorithm or logic), as taking an action or causing a result. Such expressions are merely a convenient way of saying that execution of the instructions of the software by a computer or equivalent device causes the processor of the computer or the equivalent device to perform an action or a produce a result, as is well known by persons skilled in the art.

In a virtualized computing system, a plurality of users may share a computing resource. A plurality of independent user applications may be hosted by a single server, or be distributed over a plurality of servers. Similarly, a plurality of servers may access a shared memory system. The server or plurality of servers may be collocated or remote from each other. In some instances, more than one user or application program instance may be permitted access to a shared memory area. The servers may be connected to the shared memory system by any communications means, medium or transport layer.

The memory system may be presented to the servers as a block storage device where the full extent of the memory system is provisioned as logical unit numbers (LUN) and the form of provisioning is, for example, thin or thick, as is known in the art. The LUNs may be presented to, for example, servers operating under VMware ESX 5 (available from VMware, Inc., Palo Alto, Calif.) over, for example, Fibre Channel or iSCSI transport. The LUNs may be comprised of sectors having a sector size and a logical block address (LBA) that is modulo the sector size. Typically the sector size is 512 bytes(b) to be compatible with the legacy hard disk technology, although other sector sizes, and variable sector sizes on a LUN basis or otherwise, for example, are possible.

Inevitably the terminology of legacy disk technology and that of solid state memory systems, such as a FLASH memory array conflicts, particularly in the definition of sector, page, block and the like. So, sectors have a logical block address (LBA) when the storage is visualized from a legacy standpoint, as is typical of most existing virtualization approaches, whereas internal operations of the solid state memory system may treat a block (of memory) as a specific group of number of pages (e.g., 128 pages) each page comprising a number (e.g., 4) of sectors having a size (e.g., 512b). Just as the firmware or software of the memory system needs to accommodate these constructs, a person of skill in the art would appreciate the meaning and use of the terminology at the present state of the art. This terminology may evolve further, but a person of skill in the art will have no difficulty in comprehending the implications. Often a request for data having an LBA is intended to retrieve a page of data having a base address of the LBA, or where the LBA of a sector is adjusted to retrieve the page of data having the sector desired. The specific approach to defining addresses and using them in a system depends on the user needs and philosophy and is not intended to be limited by the description herein.

When a computer processing application is virtualized, the applications program or guest operating system cannot presume to be aware of the physical location of the data (including metadata) in the memory system. The functions are performed on logical constructs. The virtualized server may use primitives that convey virtual machine operations to storage hardware at a meta-level instead of at the traditional data level. These primitives may be issued, for example, via in-band application programming interface (API) commands. One may expect that at least some of these APIs would use industry standard commands and protocols that exist ore will be adopted in future. However special purpose commands (e.g., manufacturer-specific) may be developed which may be issued to the memory system over the transport layer.

In an aspect, where a the term server is used, the term is intended to also convey the property of a user program of a plurality of user programs hosted by a virtualized server and which may operate independently of each other.

An example of a standardized (but optional under the standard) command is ATS (Atomic Test and Set), that allows for an initiator to "lock" an LBA sector by sending a SCSI SBC-3 Compare and Write command to a provisioned LUN. This command provides for the uninterrupted execution of the command or the failure of the command without corruption of the data. The SCSI standard is maintained by the T10 Technical Committee of the International Committee on Information Technology Standards (INCITS) and is subject to revision, from time-to-time; however, it is the conceptual functionality of this command that is being described herein, and other commands or functions having a similar intent are not excluded.

Certain memory operations may require atomicity. That is, either the operation completes entirely, or the operation fails without other consequences (such as data loss, corruption, or loss of state). Such atomicity may be needed for metadata supporting a virtualized environment.

An Atomic Test and Set (ATS) primitive is described that atomically modifies data of a sector (either logical or physical usually through indirection) without needing to lock out other applications or servers from concurrent access to a shared LUN. On receiving an:
 atomic_test_and_set (uint64 lbn, DiskBlock oldImage, DiskBlock newImage);
(hereinafter ATS) the memory system atomically checks to determine whether the contents of the sector at logical block number lbn (LBA) are the same as provided in oldImage, and if yes, replaces the sector contents with the sector contents provided in newImage. We describe the process at sector level; however, this is not intended to be a limitation.

The memory system is configured to return an error if the execution of the ATS command were to be unsuccessful. A standard error code such as described in section 5.2 of SBC3r22 may be used: for example, the ATS failed because there was a mismatch between oldImage and the current image in memory (most likely because of an intervening ATS command on the same lbn from another host interested in the same lock). Other suitable error codes may be returned for other ATS failures. Unique error codes may be used on a system basis.

Data stored in the memory system may be, for example, file data and metadata for the file data. The metadata representing attributes of the file data may be read, modified, or locked so as to control access to the corresponding portion of the file data.

FIG. 1 illustrates a memory system suitable for a high availability (HA) use case. By providing access to the memory system 10 through a switch fabric, local network, or the like, the servers 5 representing, for example, users which may be guest operating systems, application programs, or the like, may be afforded redundant access to the memory system 10. The transport mechanism for connecting the servers 5 to the memory system 10 may be any of the known digital transport mechanisms now being used, or which may be later developed. They may include Fibre Channel (FC), iSCSI, InfiniBand, FCoE, Ethernet, various wireless protocols, and the like. These also may include transport mechanisms that are the equivalent of the construct currently known as the "cloud", the Internet, or transport mechanisms with these and other enhanced functions that may be developed in future.

The memory system 10 may also have redundant properties, only some representative examples of which are shown. For example, the memory gateways 15, which may themselves by fully capable computers, the memory controllers 20 and the memory modules 25 may each be replicated and configured so as to maintain connectivity and data integrity in the face of a failure of one or more components. The interconnection of the elements of the memory system 10 may facilitate, for example, hot-plug replacement of a failed modular component (e.g., memory controller 20) while preserving essentially full operational performance. An example of an interconnection system having such attributes is shown in U.S. Ser. No. 11/975,269, entitled Interconnection System, which is commonly owned and which is incorporated herein by reference as a non-limiting example.

Concomitant with this capability, other functional aspects such as the power supplies, fans, and the like may also be redundant and hot-swappable.

Data (which may include metadata, user data, housekeeping data and the like) may be stored in the memory system 10 in a redundant manner so as to preserve data integrity when a memory module 25 or other component fails. An example of redundant data storage is RAID (originally, Redundant Array of Inexpensive Disks), although this would exclude RAID 0, which does not provide for any redundancy. The use of RAID in solid state memory systems is described in, for example, U.S. Pat. No. 8,200,887, entitled Memory Management System and Method, and U.S. Ser. No. 11/901, 224, entitled Memory System with Multiple Striping, which are commonly owned and which are incorporated herein by reference as non-limiting examples. The hardware redundancy and software re-configurability described are aspects of the particular example and are not a limitation on the lock-management concept described herein.

In an aspect, all of the server requests may be routed to one of the two memory gateways 15 and thence to the memory controllers 20. In an example, one of the memory gateways may be used as a "passive" spare. The information needed for the passive spare to take over the function of the other memory gateway, in the event of a failure, may be continually exchanged with the active memory gateway or other system components, but all functional operations may be performed by only one memory gateway 15. In the event of a failure, server requests, and responses thereto, are rerouted to the "spare" memory controller, and the failed memory controller replaced. The replacement controller may now be used as the spare.

However, reserving one of the memory controllers 15 as a spare may reduce the average processing capability of the memory when in normal operation.

In another aspect, the server requests may be routed to either of the memory controllers 15 in accordance with a policy and the received server requests executed by the remainder of the memory system 10 through the memory controllers 20. This may termed an "active/active" configuration as both gateways 15 are fully functioning. While only two memory gateways are shown, a plurality of memory gateways may be connected to the memory controllers through a fabric, and may also intercommunicate through the fabric connecting with the servers 5.

The memory system 10 may be a block storage device and be a resource shared by a plurality of servers, users and programs. Such a device may provide storage to a virtualized environment where the using programs view the data storage environment as being a flat memory space. That is, the location of data may be described by a logical block address (LBA) range representing the entire memory capacity of the memory system 10. Alternatively the memory address space may be partitioned by indirection such so as to provide specific functionality to using servers. The memory may be allocated to the various requesting entities as logical unit numbers (LUNs) and be, for example, fat or thin provisioned depending on the needs of the user. Some of the LUNs may represent data (and metadata) shared between a plurality of users at logically, physical, or geographically separated locations.

Figure 2:
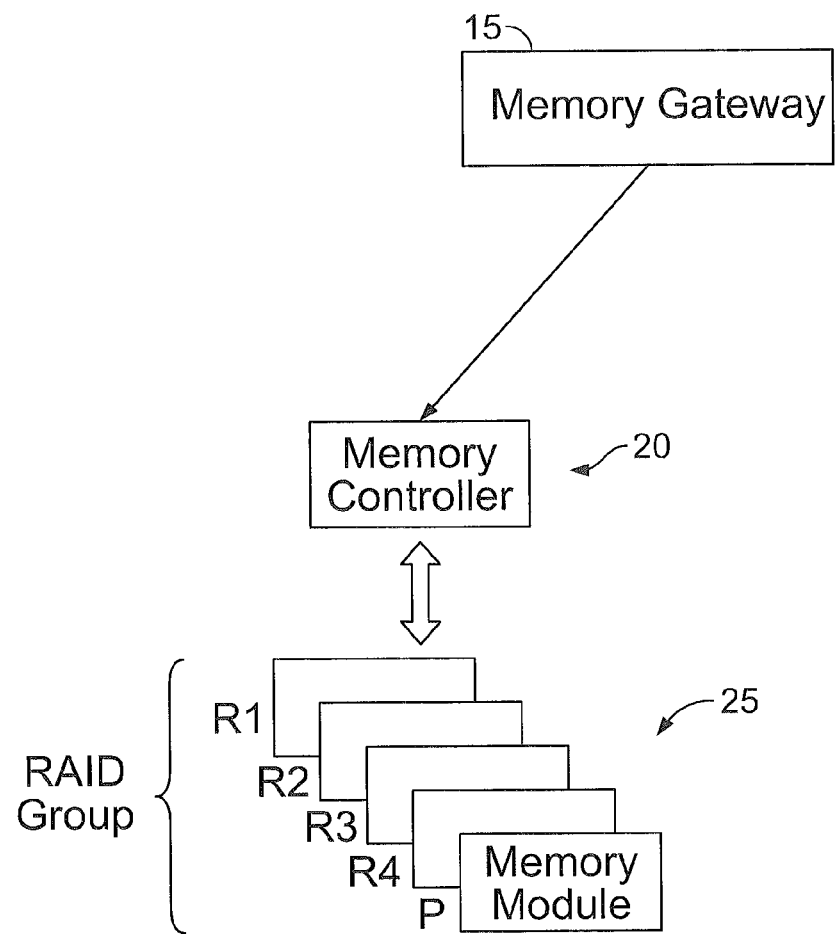
FIG. 2 illustrates a portion of the storage system of FIG. 1, where a user requested data operation is performed on a group of memory modules configured as a RAID group.

In an example, when a request is received by a memory gateway of the plurality of memory gateways 15, the LUN and logical block address (LBA) of the request may resolved into an internal logical address within a large linear address space. An algorithmic or look-up table approach may be used for mapping the logical address to a particular memory controller 20 of the plurality of memory controllers, which may have an associated group of memory modules 25 which may comprise a RAID group (R1, R2, R3, R4, P) as shown in FIG. 2. Alternatively, the RAID group may be allocated such that, for example, one memory module 25 communicating with a controller 20 is R1, a second memory module 25 communicating with another controller 20 is R2 and so forth. The allocation of modules to RAID groups may depend on the connectivity architecture of the memory system so as to achieve the needed redundancy.

The ATS (Atomic Test and Set) command allows an initiator (user, server, program) to "lock" an LBA or sector by sending a SCSI SBC-3 Compare and Write command to a provisioned LUN. The first 512 bytes passed to the memory controller representing the expected existing data are compared with data read from a specified LBA sector and if a match is determined, a second 512 bytes that have been passed are written as a data replacement to the same LBA. (Here, as elsewhere, data may be metadata, user data, parity data, housekeeping data or the like, depending on the context, and the use of the term not intended to be a limitation.) In this description the lower level operations of the memory system 10, occurring in the memory modules 25 are not described in any detail. Where the memory modules 25 are FLASH memory, the operations may be managed as described in U.S. Pat. No. 8,200,887. However, this is only one of the methods that can be used and is not intended to be a limitation. Ultimately, the data is read from and written to physical memory locations. In disk memory systems, the data is often read and written to the physical memory location. For FLASH memory systems, the data may be read from one physical location and written to another physical location, with the process being managed by a Flash Translation Layer (FTL) as is known. Where a FTL is used, the user is generally isolated from knowledge as to the actual location of the data.

A person of skill in the art would appreciate that the memory gateway 15, the memory controller 20 and the memory module 25 are computing devices that have been given functional names for convenience in description. Each of devices may have a processor, volatile and non-volatile memory and a variety of external interfaces so as to communicate with each other or with external resources such as the servers 5. The type of processor, amounts of memory and interfaces would be selected during system design based on overall performance requirements, including cost and maintainability. The functions of one or more of the devices may be combined, or the functions may be further subdivided without limiting the present description. The functionality of the modules is defined by a stored or loadable set of program instructions that configures the processor, interfaces, and the like, to perform the functions described herein.

As shown in FIG. 1, the modules of the memory system 10 are configured such that the data is more persistently stored in the memory modules 25, which may be any form of memory. For example, FLASH memory may be used as the main memory type. DRAM memory may be provided in the memory modules 25 for buffering and related computational uses and for storage of temporary tables, and the like. Other persistent memories are being developed and may be used when they become economically viable.

The ATS command is expected by the user to execute atomically across the active/active memory gateway environment. However, the required read, compare, and write operations may execute independently and may interleave these operations between commands originating from a plurality of memory gateways accessing and operating on the same LBA location through a plurality of memory controllers. For example, when one gateway reads the LBA to compare the data, the second gateway may have already compared and written replacement data to the same LBA and reported success to its initiator. A technique is required to coordinate contention from the gateways that have access to the same LBA and is serving the same LUN to multiple initiators.

A set of registers in each of the memory controllers 20 is available to both memory gateways and may be used to manage the process. The memory controllers 20 may have a local range of address space. The memory controllers 20 may have at least two ports for interface with the memory gateways 15.

In an example, a 32-bit lock register may be used at each memory controller 20 to provide 32 locks. When a memory gateway 15 processes an ATS operation, a lock based on the local LBA is secured. The address of the LBA, which may be expressed in terms of the local address space managed by the memory controller 20, may be hashed onto one of the 32 bit positions of the lock register. This permits up to 128 simultaneous locks (e.g. for 4 memory controllers×32 bits), providing that the base addresses are reasonably evenly distributed with respect to the memory controllers.

In an example, data being stored may be striped in, for example, from 4 KB to 12 KB strips per memory controller and this striping distributes the ATS locks amongst the four memory controllers 20 (Corresponding to a block size of 16 to 48 KB, which are commonly used today. The bock sizes and other details of memory systems are constantly evolving and the present description is not intended to suggest specific block sizes, lock register sizes or groupings of modules as being limiting.).

Figure 3:
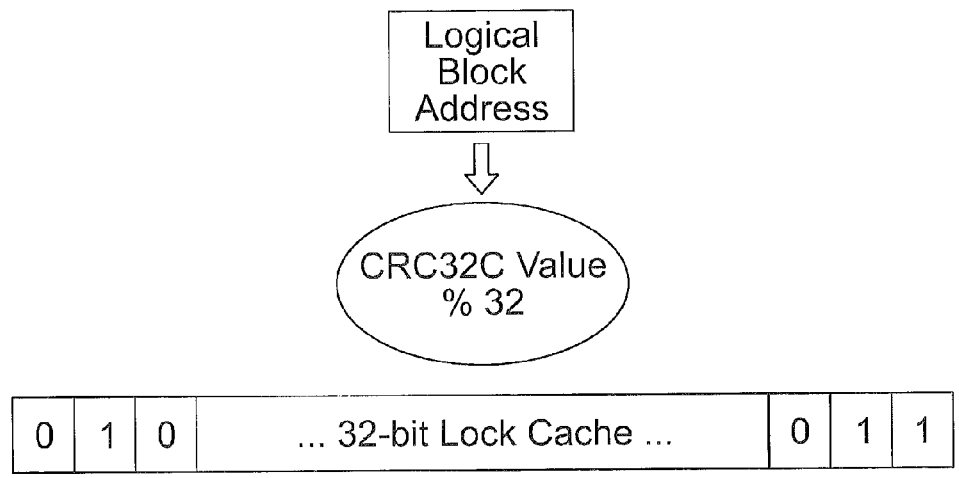
FIG. 3 shows the relationship of a logical block address (LBA) to a bit position in a lock register.
Figure 4:
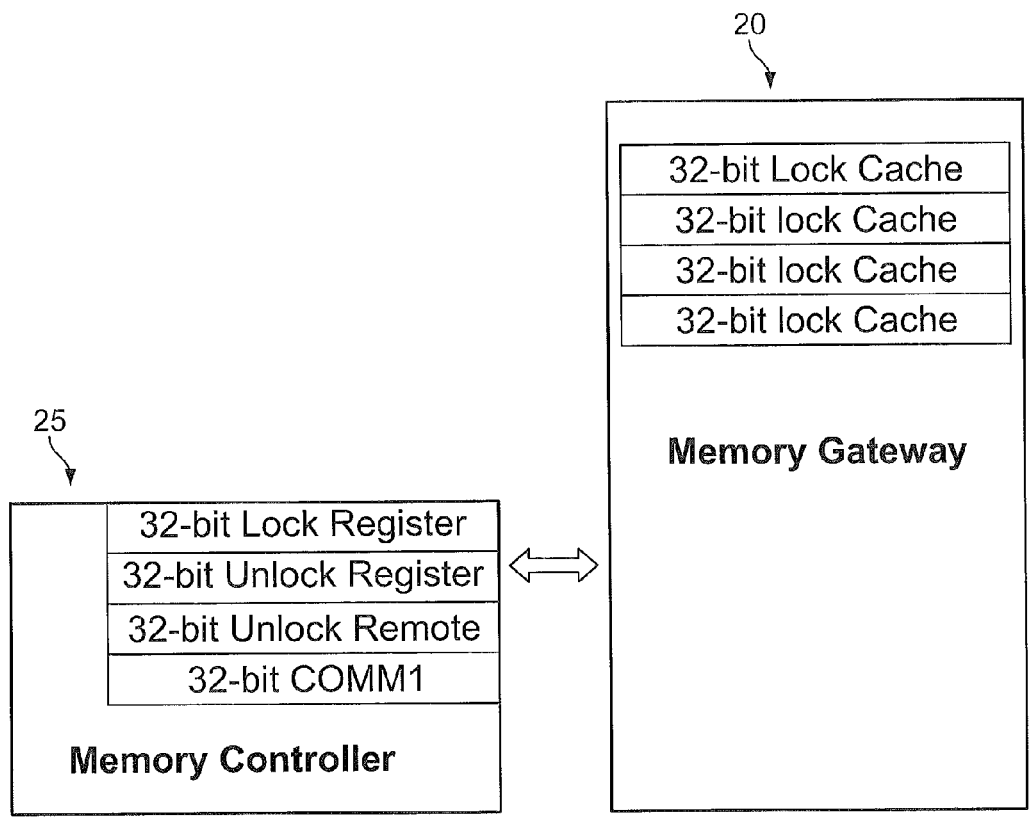
FIG. 4 illustrates an example of the relationship of various data structures that may be used in the granting of a lock on a memory region.

One convenient means of computing the lock bit position in an Intel CPU is to use the built-in CRC32 instruction. A Linux kernel module application programming interface (API) call to crc32c ( ) against the LBA address can, for example, be applied modulo 32 to determine which lock bit position of the 32 bits in the lock register is the appropriate lock bit position. (FIG. 3). Linex is an example of a currently used operation system that provides an API call to an inbuilt cyclic redundancy code (ere) function. Other operating systems or special purpose hardware may also be used.

The requesting memory gateway 15 writes the computed position value of the lock bit, represented by the value "1" in an appropriate bit position to the associated memory controller 20 as a test value, where the test value is compared with the current contents of the local lock register. If the current value of the lock register is "0", then there is no existing lock, and a value of "1" is returned to the requesting memory gateway 15, granting the lock, as the local lock register value was set to "1" as a consequence of the test operation. The value of "1" returned to the memory gateway 15 indicating that a lock has been granted by the memory controller 20.

Alternatively, a lock may have been previously granted to the other memory gateway 15 for the requested lock bit (and not as yet released). Thus, the value of the local lock register at the memory controller 20 would be "1" when the test value "1" was evaluated, and a "0" would be returned to the requesting memory gateway 15 indicating that a lock cannot immediately be granted by the memory controller 20. Since the execution of an ATS operation in a solid-state memory system is quite rapid as compared with a typical execution time in a rotating-disk memory, the lock can be expected to be released shortly, absent an unexpected fault. A request for lock that has been denied may be put in a queue at the requesting memory gateway 15 and retried in due course. That is, after a short time delay, which is about the time interval to perform a typical memory operation.

In rare instances, two different LRA values passing through a same memory gateway 15 may hash to the same bit location in the local lock register at the target memory controller 20. That is the hash function modulo 32 may not be uniquely mapped to only one LBA in the address range of the memory controller 20. In this circumstance, the locking process will respond as if the lock had previously been granted to another memory gateway for a same LBA, since the two LBAs cannot be distinguished and the request is routed to the retry queue at the requesting memory gateway. Shortly, the lock will be released by the same memory gateway as had requested the lock and when the request for lock is retried, the lock will be granted.

One should recognize that the size of the lock register can be increased if more simultaneous locks are desired to deal with a particular design. Alternatively, more advanced hash filters such as a modified Bloom filter can be used to reduce the probability of lock conflict. However, even in the event of a lock conflict, the result is a short delay in executing one of the requests, but a data error is prevented.

Once the ATS command has been completed, the lock bit position associated with the LBA of the lock may be released. This has the effect of setting the corresponding bit of the local lock register to "0" and permitting a lock to be issued to the hashed LBA value resulting in at that bit position, if subsequently requested by either memory gateway 15.

The other (non-requesting) memory gateway 15 may be notified of the lock release by writing the current local lock register value (that is the new local lock register value) to a communication register, hereafter referred to as COMM, and either transmitting the value to the other memory gateway 15 or generating an interrupt at the memory gateway 15 that results in reading the contents of the COMM register. The other memory gateway evaluates the value obtained from COMM register to determine whether any pending locks have been released and lock acquisition retry could occur. (This is an alternative to a time-dependent retry.) The COMM register may also be written to, or an interrupt generated, at periodic intervals (for example, two seconds, 100 msec, depending on system design requirements) as a keep-alive mechanism to notify the memory gateways that the memory controller is still present and active.

When a lock acquisition attempt fails, but no keep-alive COMM register update interrupt has been received within a specific time period, then a lock-stuck cleanup process may ensue. For example, a separate cleanup unlock register may be provided to allow a memory gateway to unlock any or all of the lock bits on the other memory gateway. This would be used if the other memory gateway held a lock and then became unresponsive, such that the lock was not released. Other methods of recovering from a partially failed state may be used. The timeout intervals are given as representative values, however the values that may be used depend on the specific system design, and could vary considerably from those stated, by orders of magnitude, as the response times of systems improve.

Figure 5:
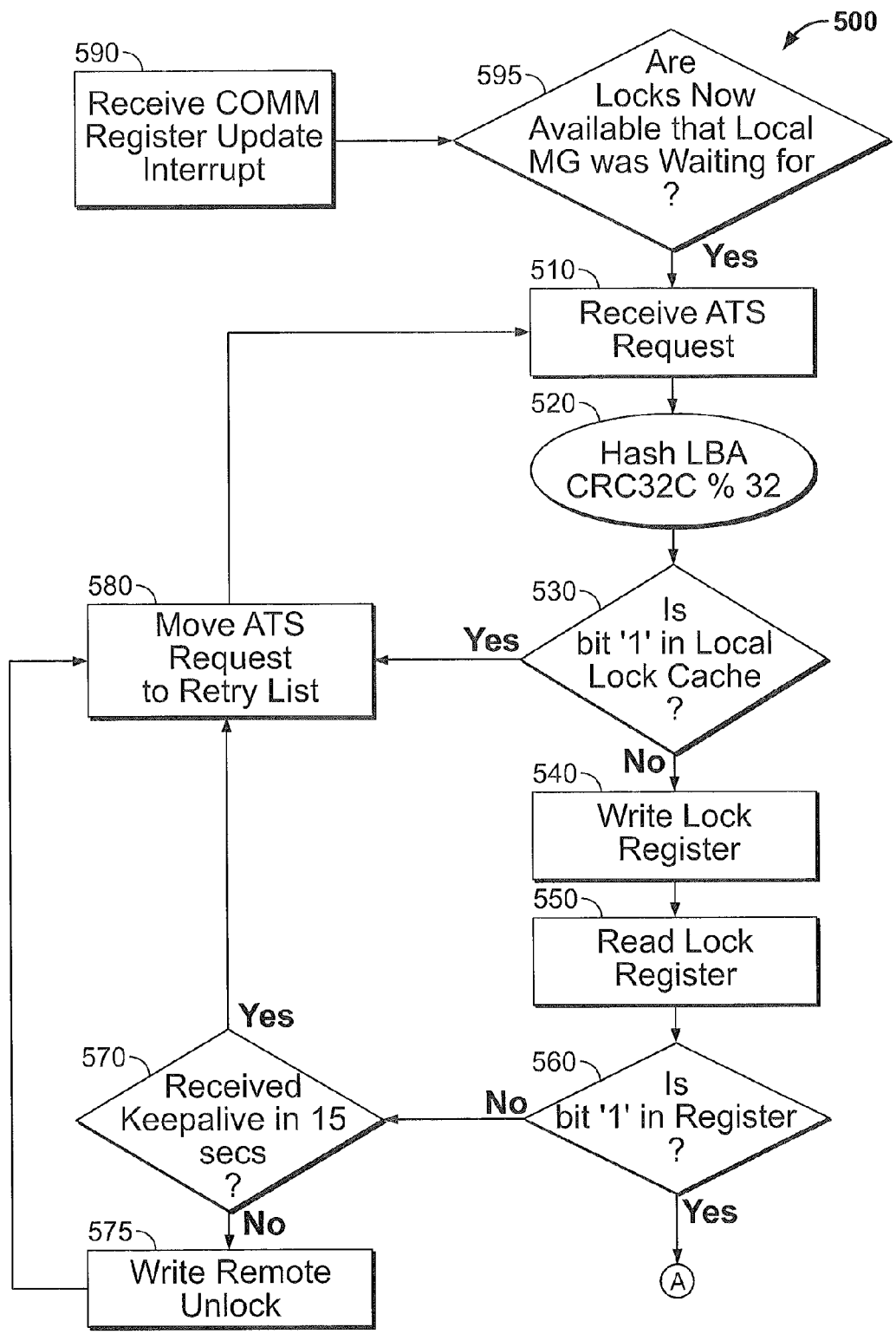
FIG. 5 illustrates an portion of an example of a method of managing the granting of a lock on a memory region.
Figure 6:
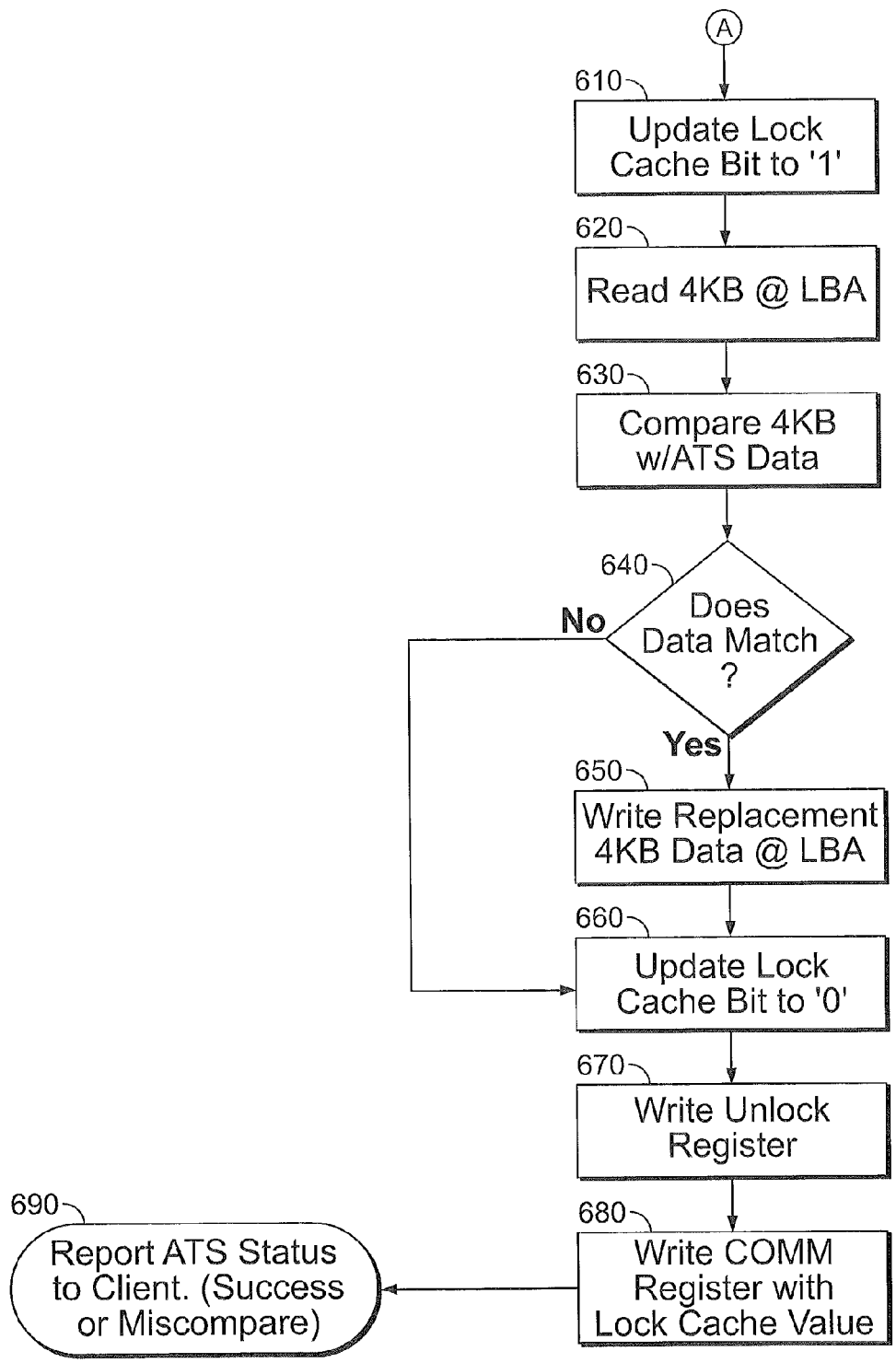
FIG. 6 illustrates another portion of the example of a method of managing the granting of a lock on a memory region.

FIGS. 5 and 6 illustrate a simplified flow chart of the method 500. In an example of the method of operation of the memory system shown in FIGS. 5 and 6, an Atomic Test and Set (ATS) request is received at a memory gateway 15 of the memory system 10 (step 510). The ATS request may have a payload that includes the expected value of the currently stored data and the new data to be stored. The ATS request may be directed to a particular provisioned LUN and LBA therein. The software protocol of the memory gateway 15 that is associated with LUN provisioning and management resolves this LUN, LBA tuple into a particular memory controller 20 and the local LBA in the memory modules 25 associated with the memory controller. This local LBA is hashed modulo 32 (step 520) so as to represent a single bit (a "1") at a specific bit position in a 32-bit data structure. The data structure contents are compared with the contents of the lock cache (in the memory gateway) at the specific bit position (step 530) for the memory controller that represents the resolved LBA.

Four cache registers are shown in the memory gateway of FIG. 1, corresponding to the four memory controllers of the configuration shown, and representing the lock status of the corresponding memory controller. The lock status comparison may be done by an exclusive-OR operation as only one bit is set to "1" in the hash result data structure. If the preexisting value in the cache register representing the target memory controller was "0", then there was no local preexisting lock and a lock request may be attempted on the hashed address through the lock register in the memory controller. The lock is established by writing a value of "1" into the lock register (step 540) in the memory controller.

However, if the existing value of the bit at the desired position in the lock cache was "1" a lock has already been granted to another requestor on a memory gateway and not subsequently reset, the request is denied (step 580) and the pending lock request is placed in a queue at the memory gateway for a retry. Checking the lock cache at the memory gateway, avoids writing and reading the lock register in the memory controller if a lock on the requested bit position is already held by the same memory gateway. The retry request buffer may be managed so as to retry the requests in order of time received, so that later requests for operations to the same LBA are performed in a correct order. The queues may be maintained on a hashed-bit-location basis, an LUN basis, or the like. Alternatively a later ATS request (which may have come from the same or a different user, may cause the earlier-pending ATS request to be failed as the data is in the process of being contemporaneously modified, depending on the design protocol.

When the lock request is successful, the bit at the requested position in the lock register in the memory controller is set to "1" (step 540) followed by reading this same register back (step 550) and confirming the bit is still "1", then the lock is established. If the bit is "0" then the lock was not obtained. The memory controller determines which memory gateway obtains the lock bit. Only one memory gateway can hold a specific lock bit in a memory controller at any one time.

Step 590 may occur asynchronously. When a memory controller writes a new value into the communications register (COMM) located thereon indicating a change in the lock register, an interrupt may be generated on the memory gateway. The value read from the COMM register is the new memory gateway lock cache value from the other memory gateway. If any of the lock bits in this value are now unlocked or '0', then the memory gateway may attempt to acquire a lock on free bits, which may include lock requests that have been queued as described above.

The corresponding bit in the lock cache is set to "1" so as to indicate that a lock has been taken on the hashed LBA by the requesting memory gateway (step 610). The other memory gateway would not be aware that the lock had already been taken until it attempted to obtain the lock by following steps 530, and potentially 540, and 550.

The memory controller may read data from the locked LBA (step 630) that, in this example, has a size of 512B and may be comprised, for example, of 4×128B strips of a RAID group, stored on 4 separate modules in the memory controller 25. In this example, only 4 of the 5 modules storing the RAID group are used (4 data strips and 1 parity strip) so as to take advantage of an "erase hiding" technique for FLASH memory such as described in U.S. Pat. No. 8,200,887, which is incorporated herein by reference. When one of the strips is temporarily unavailable, the parity strip is available and the data is reconstructed so as to represent the desired data for comparison.

In an aspect, the 512 bit value may be representative of a larger data interval. Other test data sizes may also be used.

The retrieved data (or a hash representing the data) may be compared with the furnished expected data (or expected hash) (step 630) and if a complete match results, the expected data is still stored in the LBA (step 640) and it is appropriate to write the replacement data to the LBA (step 650). If they do not match, the data has been changed by another requestor, user or the like, and the process skips step (640) since it is presumed that the data stored in the LBA is meaningful to at least the other party and the discrepancy needs to be resolved at a higher level in the system architecture.

Releasing a lock may be accomplished, for example, by updating the appropriate bit in the appropriate memory gateway lock cache to "0" (step 660). The lock may also be updated (670) by writing a '1' in the bit location to the unlock register. For coordination with the other memory gateway, the COMM register may be written with the current value of the local memory controller lock register value (step 680). The write of the COMM register generates a hardware interrupt on the partner memory gateway to indicate that the lock status has changed. The partner memory gateway may read the COMM register value (step 590) to determine if any lock bits are now unlocked that were queued for a lock allocation (step 595) and retry any pending lock requests. At this juncture, the ATS status may be reported to the client (step 690).

The physical location of the various registers may be different than described above. For example, the COMM register may be maintained at the memory gateway rather than the memory controller. The specific algorithmic operations to set and test bits in the various registers are exemplary only and other sequences of operations may be used to similar effect.

Failure of a memory controller may be recognized by various mechanisms. In an aspect, the COMM register is updated whenever there is a change in the lock status as represented by the lock register on the memory controller or periodically as a keep-alive by the memory controller if there has been no change in lock status for a period, such as two seconds. A periodic keep-alive update of the COMM register may, for example, generate a corresponding interrupt at each of the memory gateways. The memory gateway may read the COMM register and update the lock cache.

Where a memory controller has failed, the keep-alive interrupt will not be provided by the memory controller and the failure of the memory controller will be detected. The last update of the COMM register represents the lock status of the failed memory controller at the time of failure. Locks present at the time of a failure may not have completed. Reconfiguration and recovery of the system may proceed from this epoch.

Where the system architecture provides for redundant data paths from the memory controllers to memory modules, the memory modules assigned to the failed memory controller may be reassigned to operating memory controllers. Where the system architecture provides for redundant paths between the memory gateways and the memory controllers, the memory gateway may be granted access to the memory modules previously controlled by the failed memory controller.

Moreover, although the present example of the memory system and method uses a pair of memory gateways communicating with four memory controllers, the number of memory gateways, the number of memory controllers, or the number of memory modules associated with a controller is not considered to be limited by this example.

In another aspect, the COMM register at a memory controller, or a register on a memory module, may be used to store the current status of the lock register for some or all of the other memory controllers, in a similar manner to the lock cache registers of the memory gateways. The devices sharing a common lock domain may be configured or reconfigured, so that local lock domains or a global lock domain may be established. A lock domain may extend across multiple memory systems in a clustered memory system.

The process of managing access to an LBA through a lock register may be used as the basis of other functions where the access to an LBA is shared between a plurality of devices or processes and the exclusivity of access to the LBA or other resource needs to be maintained for a period of time so as to successfully complete the desired operation. Such operations may be in place of the ATS operation or share the locking function with the ATS operation.

Although only a few exemplary embodiments of this invention have been described in detail above, those skilled in the art will readily appreciate that many modifications are possible in the exemplary embodiments without materially departing from the novel teachings and advantages of the invention. Accordingly, all such modifications are intended to be included within the scope of this invention.

What is claimed is:

1. A memory system having an address extent, comprising:
a plurality of memory modules;
a plurality of memory gateways, each memory gateway having a communications interface configured to interface with a network,
wherein memory gateways of the plurality of gateways are configured to receive a request for exclusive access to an address within the address extent of the memory system and to manage requests so as to provide such exclusive access unless such exclusive access to the logical block address has been previously requested and such exclusive access has not been relinquished; and, the management of the exclusive access requests uses a hash computed on the requested address.

2. The memory system of claim 1, wherein the address extent comprises logical block addresses and the exclusive access is provided to a logical block.

3. The memory system of claim 1, wherein the request for exclusive access is to perform an atomic test and set function.

4. The memory system of claim 3, wherein the request for exclusive access is cancelled once the requested function has been performed.

5. The memory system of claim 1, wherein the hash value of the address is mapped to a single bit in a fixed length register.

6. The memory system of claim 5, wherein the bit corresponding to the mapped hashed value is set when exclusive access has been granted.

7. The memory system of claim 6, wherein the bit corresponding to the mapped hashed value is reset when a request for exclusive access is grantable.

8. The system of claim 1, wherein the data stored in the address is metadata of a file system.

9. The memory system of claim 1, further comprising a plurality of memory controllers,
wherein a group of the plurality of memory modules is controlled by a memory controller of a plurality of memory controllers.

10. The memory system of claim 9, wherein each memory gateway is configured to access a group of memory controllers of the plurality of memory controllers.

11. The memory system of claim 10, wherein a register in the memory controller is a fixed length register configured to use a bit position therein to enable grant of exclusive access to a logical block address represented by the hash.

12. The memory system of claim 10, wherein each memory gateway is configured recognize a failed memory controller of the group of memory controllers and to access memory modules associated with the failed memory controller through another memory controller of the plurality of memory controllers.

13. A method of managing a memory system, comprising the steps of:
receiving a request for exclusive access (lock) to an address of the memory system;
computing a bit position in a fixed length register based on a hash value of the address, modulo a length of the fixed length register;
determining whether a lock has been previously granted and:
if the lock has not been previously granted, grant the lock request and set the corresponding bit in the fixed length register; or,
if the lock has been previously granted and not released, refuse the lock.

14. The method of claim 13, wherein the lock is requested for the purpose of performing an atomic test and set operation on the address, and the lock is released after performing the operation.

15. The method of claim 14, wherein the address is a logical block address (LBA).

16. The method of claim 15, wherein the atomic test and set operation is a SCSI SBC-3 Compare and Write command to an LBA of a provisioned logical unit number (LUN).

17. The method of claim 13, wherein the bit in the bit register is reset when the lock is released.

18. The method of claim 13, wherein a refused lock request is queued for a retry.

19. The method of claim 18, wherein the retry occurs whenever the status of the fixed length register changes to indicate that a lock has been released.

20. The method of claim 19, wherein the bits of the register are reset if the register status has not been updated within a predetermine time period.

21. The system of claim 15, wherein the data stored in the LBA is metadata of a file system.

22. A computer program product, stored on a non-volatile computer readable medium, comprising:
instructions executable by a computer to:
receive a request for exclusive access (lock) to an address of a memory system;
compute a bit position in a fixed length array based on a hash value of the address, modulo a length of the fixed length array;
determine whether a lock has been previously granted and:
if the lock has not been previously granted, grant the lock request and set the bit in the array; or,
if the lock has been previously granted, refuse the lock.

23. The computer program product of claim 22, wherein the hash is computed using a crc32( ) of an Intel processor and represented as a bit position modulo the length of a hardware register.

24. The computer program product of claim 22, wherein the address is a logical block address (LBA) and a lock on the LBA is required prior to performing an atomic operation on the contents of the LBA.

25. The computer program product of claim 24, wherein the contents of the LBA are metadata of a file system.

* * * * *